United States Patent [19]

Van Ooyen

[11] Patent Number: 4,545,624
[45] Date of Patent: Oct. 8, 1985

[54] CRAWLER TRACK TENSIONING AND DRIVE SYSTEM

[75] Inventor: Richard C. Van Ooyen, Schofield, Wis.

[73] Assignee: J. I. Case Company, Racine, Wis.

[21] Appl. No.: 466,872

[22] Filed: Feb. 16, 1983

[51] Int. Cl.$^4$ .................. B62D 55/00; B62D 55/30
[52] U.S. Cl. ............................... 305/9; 305/10; 305/31; 192/13 R; 192/8 R
[58] Field of Search ................ 305/9, 10, 31; 192/13 R, 8 R, 3 N, 3 TR, 12 C

[56] References Cited

U.S. PATENT DOCUMENTS

| | | | |
|---|---|---|---|
| 3,101,977 | 8/1963 | Hyler et al. | 305/10 |
| 3,310,127 | 3/1967 | Siber et al. | 305/10 X |
| 3,536,230 | 10/1970 | Williams | 192/3 N |
| 3,910,649 | 10/1975 | Roskaft | 305/10 |
| 3,972,569 | 8/1976 | Bricknell | 305/10 |
| 4,201,279 | 5/1980 | Fukui | 192/3 N |

FOREIGN PATENT DOCUMENTS

| | | | |
|---|---|---|---|
| 0008907 | 3/1980 | European Pat. Off. | 305/31 |
| 55-51672 | 4/1980 | Japan | 305/10 |
| 718320 | 2/1980 | U.S.S.R. | 305/10 |

Primary Examiner—David A. Scherbel
Attorney, Agent, or Firm—Dressler, Goldsmith, Shore, Sutker & Milnamow, Ltd.

[57] ABSTRACT

An improved track tensioning and recoil arrangement for crawler track drive systems is disclosed which uniquely functions to tension the crawler tracks responsively to the load thereon. The arrangement includes a pair of hydraulic drive motors respectively associated with each of the crawler tracks for independent operation thereof. Tensioning of the tracks is provided by a hydraulic tensioning cylinder assembly. In order to tension the tracks responsively to the torque applied thereto by the drive motors, branch hydraulic fluid lines are provided from the fluid supply lines for each hydraulic motor to the tensioning cylinder assembly of the respective track. By this arrangement, tension in the track is increased as torque applied to the track by its drive motor is increased. In the preferred form, pressure relief valve means are provided in communication with each tensioning cylinder assembly in order to relieve pressure within the tensioning cylinders if it exceeds a predetermined value. This desirably permits improved track recoil response in the event that the track is subjected to abnormal tension such as by contact with a rock or like obstacle.

5 Claims, 4 Drawing Figures

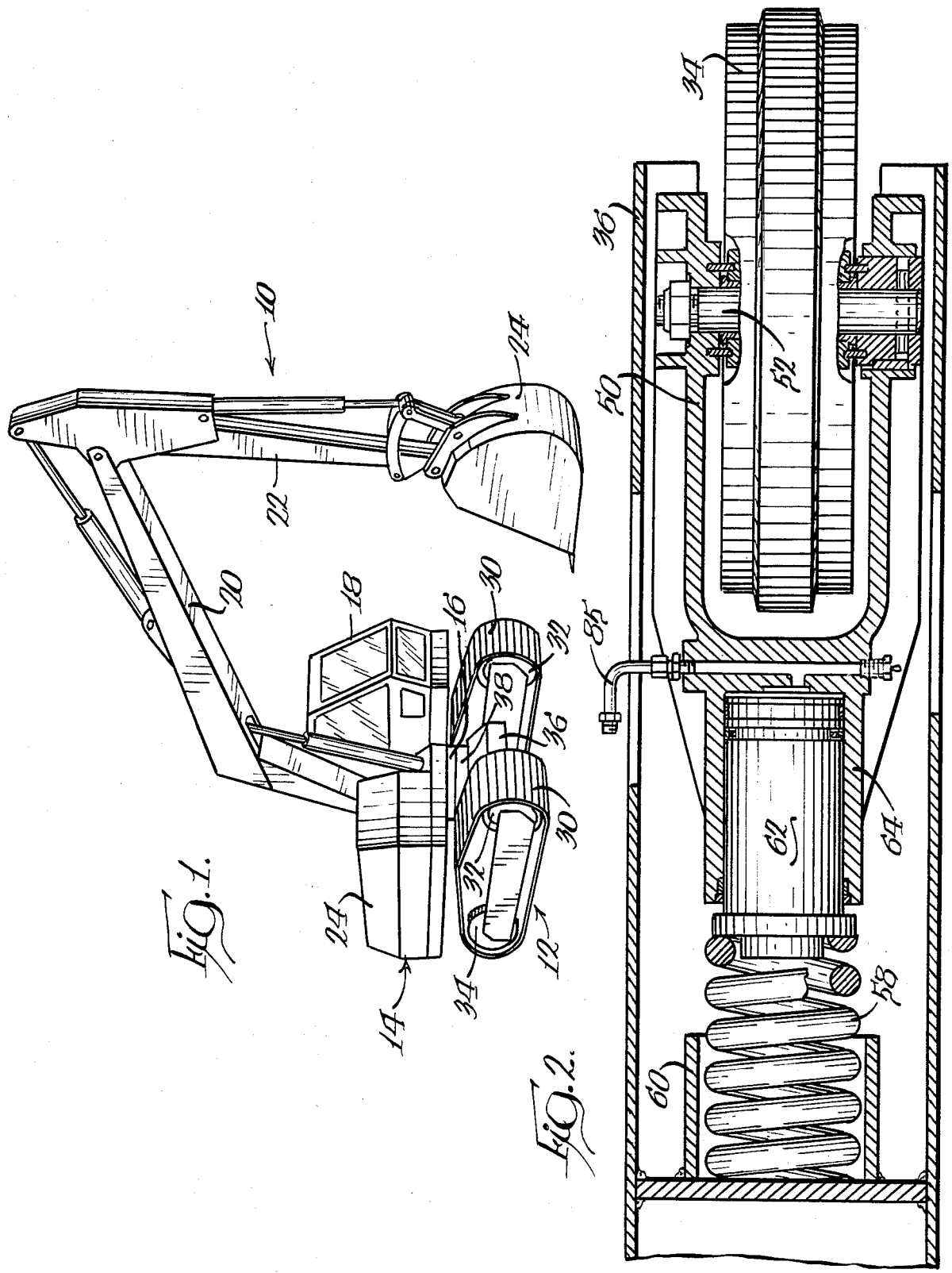

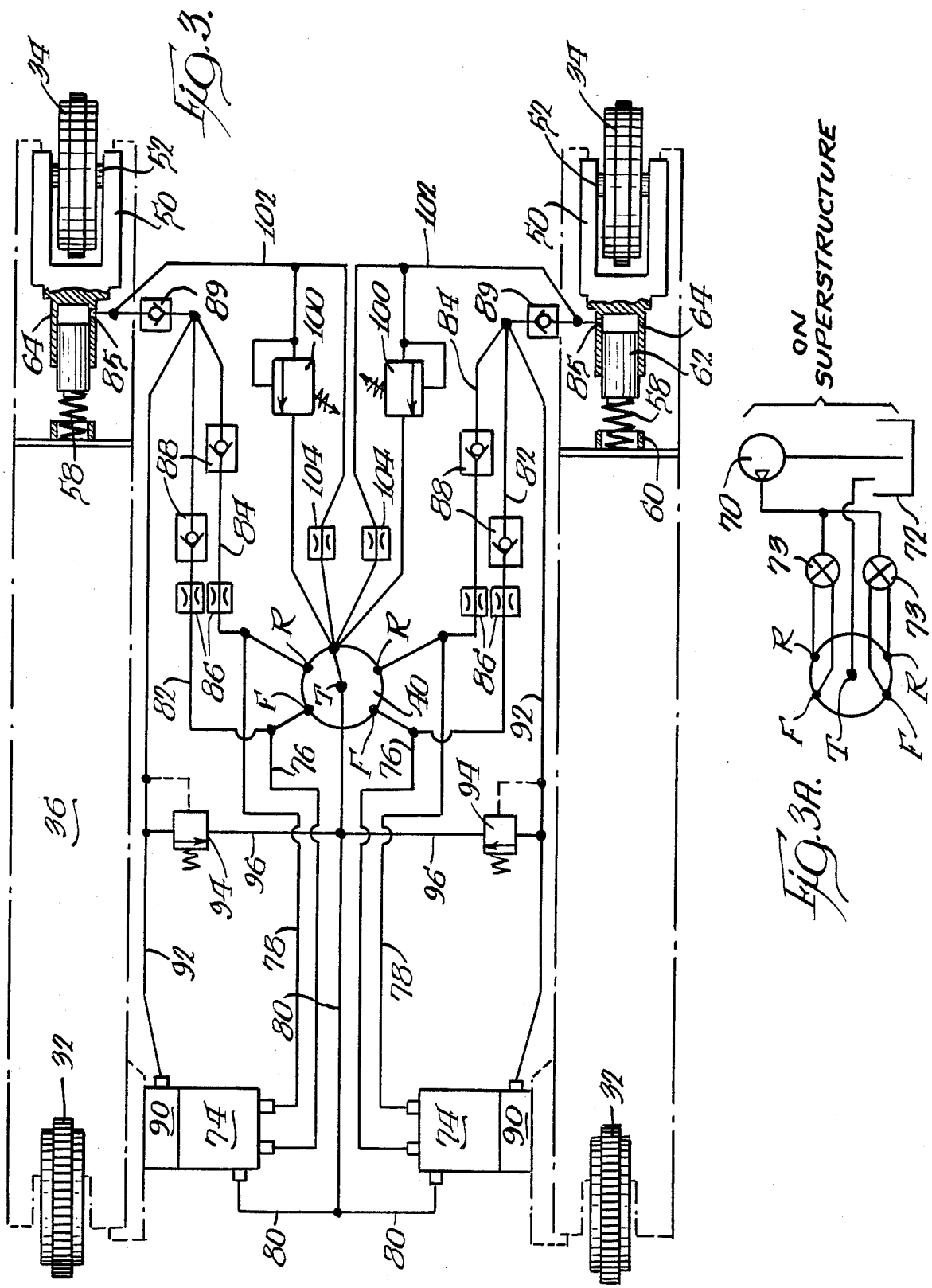

CRAWLER TRACK TENSIONING AND DRIVE SYSTEM

FIELD OF THE INVENTION

This invention relates to an improved track tensioning and recoil system for crawler units having crawler tracks, such as for tractors, excavators, earth-moving equipment and the like, and to such a system in which automatic and simultaneous increased track tensioning is provided in response to increased track motor torque. The system also desirably includes automatic recoil response and integrated track braking.

BACKGROUND OF THE INVENTION

In order to assure efficient operation of drive systems employing crawler tracks, it is necessary that proper tension be maintained in the tracks. Incorrect tensioning of the crawler tracks accelerates their wear, and can even lead to loss of a track under some operating conditions. To accommodate proper tensioning of crawler tracks, most systems employ an idler wheel positioned at one end of each track. The idler is typically movable with respect to the carriage which carries the track in order to allow adjustment of track tension.

One commonly employed arrangement for adjusting track tension is the provision of a hydraulic cylinder or the like associated with the idler wheel, with the cylinder being adapted to receive pressurized hydraulic fluid or grease for tensioning of the crawler track. While such arrangements can be effective for adjusting track tension, they typically require relatively frequent addition of fluid to the tensioning hydraulic cylinder to accommodate lengthening of the track as it wears, and to replenish fluid which seeps from the tensioning cylinder. Because such arrangements usually require that a pump be manually fitted to each tensioning cylinder for addition of fluid, maintaining proper crawler track tension can be time consuming and inconvenient. Additionally, such arrangements usually have no provision for altering track tension during operation. While a suitable fluid pressure relief may be provided to prevent excessive track tension which can occur if an obstacle is encountered, such arrangements usually then require that the tensioning cylinder be repressurized before operation can continue.

In order to eliminate the need to manually pressurize the tensioning cylinders of a crawler track drive, arrangements have been developed which include a suitable hydraulic fluid pump and valving system for supplying pressurized fluid to the track tensioning cylinders. Although this may eliminate the need for an operator to repressurize each tensioning cylinder with a hand-held pump or the like, the provision of a specialized pressurizing arrangement increases the cost and complexity of the overall crawler drive system. Additionally, such specialized pressurizing arrangements generally are not responsive to the torque applied to the crawler track by the track drive motor. Because it has been determined that there is a direct desired correlation between torque applied to the track and the desired track tension, this is a further distinct disadvantage of such tensioning arrangements.

SUMMARY OF THE INVENTION

The present invention provides a crawler track tensioning and recoil system which tensions the tracks responsively to the torque applied to the tracks by their respective hydraulic track motors. Notably, this desired result is accomplished without the provision of a specialized tensioning hydraulic pump by coupling the motive fluid supply for each of the track motors and the respective track tensioning cylinder together and in parallel so that changes in pressure concurrently and simultaneously act both on the track motor and tensioning cylinder. Substantially increased speed of response in the tensioning cylinder and smoother and more effective operation of the unit is thereby provided, with track tension being desirably provided responsively to track loading.

Coupled with the improved drive and tensioning system is a recoil system which automatically relieves pressure in the tensioning cylinder when it increases to a predetermined excessive level, as when a track rams an object or is tensioned abruptly, as by a large rock or other object. The excessive pressure is automatically sensed and relieved to avoid excessive track tension and possible damage. The system then automatically repressurizes the tensioning cylinder responsively to the track motor torque so that the desired correlation between motor and tensioning cylinder pressures may be maintained.

Desirably the automatic tensioning response system may be coupled with a hydraulic brake system. The brake system includes spring-actuated track brakes which are released when pressurized fluid is applied to them. Thus, motive fluid pressure, directly coupled in parallel to the track tensioning cylinder pressure, may also be directly coupled to the brake release system. As long as the fluid pressure is at a level at which the motor is driven (and tensioning cylinder pressurized), the line pressure to the brake release mechanism is maintained. When the pressure drops below that which is sufficient to drive the associated track, the brake release mechanism is automatically activated to apply the track brake. Thus, the spring-actuated track brake is maintained in a brake-off condition when the line pressure is at a suitable elevated level, and is maintained in a brake-on condition when line pressure decreases from a predetermined elevated level.

Thus, in accordance with the present invention there is provided a crawler unit having an automatic crawler track tensioning and recoil mechanism which is directly responsive to increased motor torque. The unit comprises a carriage and a pair of endless crawler tracks, each of which is mounted on a forward drive roller and a rear idler roller, each roller being rotatably mounted on the carriage. Pressurized fluid is supplied to the carriage through suitable conduits or hydraulic lines. A hydraulic motor is provided for each drive roller, and a hydraulic cylinder assembly mounts each idler roller on the carriage for movement longitudinally of its associated track, thereby to alter the tensioning of the associated track. A compression spring means preferably acts against the hydraulic cylinder assembly to pre-tension the associated track to a predetermined degree.

At least one, and preferably a pair, of a branched or "teed" hydraulic fluid lines are provided for each track. Each branched line simultaneously connects the pressurized fluid supply directly and in parallel to the hydraulic motor and to the cylinder assembly whereby pressurized fluid simultaneously acts to operate the motor and cylinder for a track. By this unique arrangement, as motor torque increases, track tensioning simultaneously increases for the associated track. In the illustrated embodiment, the crawler unit includes a superstructure supported on a turntable or swivel for rotation on the carriage, with fluid supplied from a source of pressurized fluid comprising a hydraulic fluid pump mounted on the superstructure. The hydraulic fluid pump communicates with the branched hydraulic fluid line for each track through hydraulic swivel means on the carriage.

Means for separately automatically responding to increased tension in each said track due to abnormal conditions is preferably provided on the carriage, and comprises a pressure relief valve communicating with each tensioning cylinder assembly. Each relief valve is responsive to increased pressure in the cylinder assembly to permit hydraulic fluid to vent from the cylinder until the pressure returns to the level provided by the source of pressurized fluid. In a preferred form, a fluid bleed line also communicates with each cylinder assembly, the bleed lines each including a relatively small, flow restricting orifice for permitting constant, relatively limited fluid flow from each cylinder assembly. The crawler unit may also include brake means for each track, with each pair of branched hydraulic fluid lines including a further branch line for maintaining a track brake in a brake-off condition when motive fluid is supplied to the motor for the track.

Further objects, features and advantages of this invention will become apparent from the following description and drawings.

BRIEF DESCRIPTION OF THE DRAWINGS

FIG. 1 is a perspective view of a typical crawler unit in which the invention of this application is adapted to be embodied;

FIG. 2 is a view, partially in cross section, of the idler roller tensioning assembly of this invention; and FIG. 3 and FIG. 3a are a schematic hydraulic circuit diagram of the track drive, tensioning and recoil system of this invention.

DESCRIPTION OF THE PREFERRED EMBODIMENT

While this invention is susceptible of embodiment in many different forms, there is shown in the drawings and will herein be described in detail one embodiment with the understanding that the present disclosure is to be considered as an exemplification of the principles of the invention and is not intended to limit the invention to the particular embodiment illustrated. The scope of the patent is to be limited only as may be necessary in accordance with the appended claims.

Referring now to the drawings, a typical self-propelled, crawler track unit such as an excavator 10 with which the improved drive, tensioning, recoil and braking system of this invention may be used is shown. Excavator 10 comprises an undercarriage such as carriage 12 and a superstructure 14. Superstructure 14 includes a turntable 16 supported on the carriage 12, a suitable cab 18 in which an operator may sit and operate controls, and a desired material handling implement, such as a boom 20 articulatably mounting a dipper arm 22 and a bucket 24. Suitable conventional hydraulic operating control mechanisms are provided in the cab for operator use. The superstructure also mounts a housing 24 in which a hydraulic fluid tank and one or more pumps for pressurizing the hydraulic fluid drawn from the tank to operate the hydraulic systems are provided. The housing also encloses an engine, such as a suitable diesel engine, for operating the pumps, all in a conventional and known manner.

The carriage 12 is supported on a pair of endless crawler tracks 30. Each track 30 is mounted on a forward drive roller 32 at the front and a rear idler roller 34. Rollers 32 and 34 are rotatably mounted on the carriage. Auxiliary, conventional track rollers to support and stabilize each track are provided between the idler and drive rollers. The idler and drive rollers for each track are rotatably mounted on a conventional undercarriage frame 36. A support post 38 for the turntable is provided centrally of the frame to permit the turntable supported superstructure to swing 360° about the carriage 12. The support post 38 and turntable 16 include a hydraulic swivel 40 which provides continuous communication between the hydraulic fluid tank and hydraulic pumps on the superstructure and the branched hydraulic lines on the carriage, all of which, of course, are under the control of the operator via the controls in the cab.

As seen in the drawings, each of the idler rollers 34 is supported on the undercarriage frame 36 for relative movement longitudinally of its associated track 30 to alter the tensioning of the track 32. As such, each roller 34 is journalled in a yoke 50 on a roller shaft 52. Yoke 50 is slidably supported on the undercarriage frame 56. As will be appreciated, yoke 50 and idler roller 34 are biased rearwardly by a recoil and tensioning compression spring 58 which is suitably located by a frame sheath 60. Spring 58 bears against a hydraulic cylinder assembly comprising a piston 62 which extends from a cylinder 64. It should be noted that the hydraulic track tensioning mechanism described also helps to minimize the spring preloading which would otherwise be necessary during assembly. Piston 62 is adapted to be hydraulically driven outwardly of the cylinder 64, in opposition to the force of the spring 58 in the manner to be described.

Referring now to FIG. 3, a source of pressurized hydraulic fluid is provided by one or more pumps such as hydraulic fluid pump 70. Pump 70 draws fluid, as necessary, from a fluid reservoir or drain tank 72. Pump 70, in response to operator manipulated control valves 73, supplies motive hydraulic fluid to each hydraulic track motor 74 via hydraulic swivel 40. Hydraulic fluid can be supplied to each motor 74 alternatively via a forward driving pressure line 76 and a rearward driving pressure line 78. Fluid flows from the pump 70 on the superstructure through the hydraulic swivel 40 and the associated forward F and rearward R fittings to each of the lines 76 and 78, respectively. Fluid is returned to the drain tank 72 from each motor 74 via a drain line 80 and through the hydraulic swivel 40 by a tank return T.

The pressurized fluid supplied to each motor is also supplied in parallel to its associated track tensioning cylinder 64, preferably through first and second pairs of lines which branch from the motor supply lines, namely through lines 82, 84 which are directly connected to forward and reverse pressure lines 76, 78, respectively. Thus, the pressure supplied to a motor is simultaneously supplied to the associated track cylinder 64 as well, whereby as motor torque increases, track tensioning simultaneously increases for the associated track. The flow rate of the hydraulic fluid supplied to the cylinder 64 may be controlled, and reduced and restricted, as by a pair of flow restrictors 86. Alternately, a single flow restrictor can be provided for each cylinder 64 immediately upstream thereof. Each line 82, 84 also has a one-way check valve 88 in series flow relation with restrictors 88 to prevent reverse fluid flow in lines 82, 84 to assure that exhausting and venting of the cylinder 64 does not act to drive the associated motor 74. It should be noted that the provision of flow restrictors 86 upstream of check valves 88 permits the use of smaller, more economical check valves than would otherwise be required.

In the preferred embodiment of the present invention, an integrated arrangement for operation of the hydraulically released track brakes is provided. As fluid is supplied to cylinder 64 through a line 82, 84 and cylinder pressure fitting 85, it is also supplied to a brake 90 for that track via a further branch brake hydraulic fluid supply line 92. Thus, when the pressure in a line 82, 84, and in line 92, is at a level at which the associated track motor is driven, the spring-actuated track brakes are off. However, if the fluid pressure should reduce substantially, a pilot-operated brake relief valve 94 opens, causing pressurized fluid to return to the drain tank through relief line 96. That automatically activates the track brake in a known manner.

As further illustrated in FIG. 3, a further one-way flow check valve 89 is preferably provided just upstream of each cylinder 64. Flow checks 89 prevent fluid flow from each cylinder 64 to the respective one of the branch brake lines 92. Desirably, this acts to isolate the recoil cylinder assemblies from the hydraulically released track brakes so that any surge in the pressure within the cylinder assemblies does not interfere with the proper application of the brakes. Thus, the track brakes will be properly applied even if cylinders 64 are pressurized. The force of springs 58 acting through pistons 62 can create pressure in cylinders 64 even if motors 64 are stopped, in which event the track brakes will be applied despite the pressure within the cylinders.

It is thus apparent from the arrangement described so far that when a track is to be driven forwardly, pressurized hydraulic fluid is automatically simultaneously provided to the motors, brake release mechanism and idler roller tensioning mechanism, the supply lines of which are in parallel and in constant flow communication. If pressure is lost, the brakes are automatically applied. Each track 30 is preferably separately and independently operated, as is its respective motor, tensioning cylinder and brake.

This invention also provides for automatic and substantially instantaneous responses to abnormal track tensioning conditions, i.e., to abnormal track tensioning such as resulting from encountering a rock or like obstacle. Venting or relief of the tensioning cylinders is preferably provided by adjustable relief valves 100 which respectively communicate with an associated one of tensioning cylinders 64 via hydraulic fluid bleed lines 102 which respectively communicate with cylinders 64 downstream of flow checks 89. Relief valves 100 are each preferably mounted in close proximity to the respective one of the tensioning cylinders on the crawler carriage 12 since this provides a very short response time for relief of excessive tensioning cylinder fluid pressure. If response time is not kept to a minimum, track damage can result before pressure relief is effected.

Thus, if a track is excessively tensioned as by encountering a rock, the fluid pressure in the tensioning cylinder 64 will increase to a predetermined level in accordance with the adjustment of the associated relief valve 100, and will then be vented via the relief valve until the fluid pressure reaches the level consistent with the pressure being supplied to the associated track motor. For example, if the normal fluid pressure for the tensioning cylinder is 2,500 pounds per square inch (psi), when the pressure, due to abnormal track tensioning (due to recoil) rises to 3,000 psi, the associated relief valve 100 will open to allow fluid to vent from the cylinder to return to the drain tank via tank return T of hydraulic swivel 40. When the pressure condition in the cylinder 64 returns to the normal range under the operating conditions, the relief valve 100 will close. While each of cylinders 64 can be joined in communication with a single, appropriately sized pressure relief valve, the arrangement illustrated is preferred for providing independent pressure relief for the cylinders.

In the preferred embodiment, each of fluid bleed lines 102 communicates with the fluid reservoir of the system via swivel 40, and each includes a further relatively small flow-restricting orifice 104 disposed in parallel flow relation with a respective one of relief valves 100. This preferred arrangement permits constant, relatively limited fluid flow from cylinders 64. This constant fluid flow is significantly less than the pressurized flow available to the cylinders via line 82 and 84, and thus does not interfere with proper pressurization of the cylinders for track tensioning. For example, orifices 104 can be on the order of approximately 0.03 inches in diameter, in contrast to orifices 86 which can be on the order of approximately 0.125 inches in diameter.

The provision of orificed bleed lines 102 provides further distinct advantages for the present system. By bleeding the fluid in cylinders 64, the cylinders do not stay unnecessarily highly pressurized when the crawler unit is not operating. This facilitates convenient servicing. Further, bleed lines 102 permit sufficient flow to assure relief of pressure in brake lines 92 (via check valves 89) so that relief valves 94 properly open to fully relieve pressure to the track brakes 90 so the brakes are applied when motors 74 are not being operated.

From the foregoing, it will be observed that numerous variations and modifications may be effected without departing from the true spirit and scope of the concept of the present invention. It will be understood that no limitation with respect to the specific apparatus illustrated herein is intended or should be inferred. It is, of course, intended to cover by the appended claims all such modifications as fall within the scope of the claims.

What is claimed is:

1. A crawler track tensioning and drive system, comprising:
   a carriage and a pair of endless crawler tracks rotatably mounted on the carriage;
   a pair of hydraulic drive motors respectively associated with said crawler tracks for driving said tracks;
   means for supplying pressurized hydraulic fluid to each of said hydraulic motors to provide motive power therefor;
   a pair of hydraulic tensioning cylinder assemblies respectively associated with said crawler tracks for tensioning said tracks;
   means for tensioning each of said tracks by pressurization of the associated one of said hydraulic tensioning cylinder assemblies responsively to the torque applied to the track by its associated one of the hydraulic motors,
   said tensioning means comprising at least one branched hydraulic fluid line for each said track communicating with said fluid supply means, the branched hydraulic line for each said track being adapted to supply pressurized fluid from said fluid supply means to the tensioning cylinder assembly associated with the track;

a pair of track brakes respectively associated with each of said crawler tracks, each said track brake being releasable by pressurization with hydraulic fluid supplied by a further branch hydraulic fluid line of each of said branched hydraulic fluid lines, and means for preventing reverse fluid flow from each said further branch line to said fluid supplying means; and fluid bleed line means communicating with each said cylinder assembly for permitting constant, relatively limited fluid flow therefrom, each said further branch hydraulic fluid line communicating in fluid flow relation with the respective one of said cylinder assemblies via one-way flow check means for preventing fluid flow from each said cylinder assembly to the respective one of said further branch hydraulic fluid lines, whereby said fluid bleed line means are arranged to effect bleeding of fluid from said further branch hydraulic fluid lines for relieving fluid pressure in said further branch hydraulic fluid lines for effecting actuation of said track brakes.

2. A crawler track tensioning and drive system in accordance with claim 1, wherein said reverse flow preventing means comprises one-way flow check means for preventing reverse fluid flow within said branched hydraulic fluid lines.

3. A crawler track tensioning and drive system in accordance with claim 2, and means for restricting fluid flow within said branched hydraulic fluid lines.

4. A crawler track tensioning and drive system in accordance with claim 1, and pressure relief means in fluid communication with each said tensioning cylinder assembly for venting hydraulic fluid therefrom when fluid pressure exceeds a predetermined value.

5. A crawler track tensioning and drive system, comprising:

a carriage and a pair of endless crawler tracks each rotatably mounted on said carriage by a drive roller and an idler roller;

a pair of hydraulic drive motors respectively associated with the drive rollers of said crawler tracks for driving said tracks;

means for supplying pressurized hydraulic fluid to each said motor to provide motive power therefor, said fluid supply means including a forward and reverse fluid pressure line for each said hydraulic motor;

a pair of hydraulic cylinder tensioning assemblies respectively associated with the idler rollers of said crawler tracks for tensioning said tracks;

first and second pairs of branch hydraulic fluid lines, each pair of branch lines respectively communicating with the forward and reverse fluid lines for a respective one of said hydraulic motors, each branch fluid line being adapted to supply pressurized hydraulic fluid to the tensioning cylinder assembly associated with the crawler track driven by the respective motor so that each said track is tensioned responsively to the load thereon;

pressure relief valve means communicating with each said tensioning cylinder assembly for relieving fluid pressure therein when the fluid pressure exceeds a predetermined value;

a pair of track brake means respectively associated with said drive rollers of said crawler tracks, each of said pairs of branch lines communicating with a respective further branch line respectively communicating with each brake means for fluid pressurization thereof to maintain the brake means in a non-applied comdition;

flow check means for preventing reverse fluid flow in said branch fluid lines, and flow restrictor means disposed in series and upstream of said flow check means for restricting flow through said branch fluid lines, said flow check means and said flow restrictor means being provided in each said first and second pair of branch lines upstream of the respective one of said further branch lines; and further flow check means for preventing fluid flow from each said cylinder assembly to the respective one of said further branch lines, and fluid bleed means communicating with each said cylinder assembly downstream of said further flow check means for permitting constant, relatively limited fluid flow from said cylinder assemblies;

said fluid bleed means comprising a pair of fluid bleed lines in respective communication with said cylinder assemblies and further flow restrictor means for restricting fluid flow in said bleed lines, said relief valve means comprising a pair of pressure relief valves communicating with the respective one of said cylinder assemblies via a respective one of said fluid bleed lines, each said pressure relief valve being disposed in parallel flow relation with the further flow restrictor means of the respective one of said fluid bleed lines.

* * * * *